United States Patent
Randall et al.

(10) Patent No.: US 6,407,053 B1
(45) Date of Patent: *Jun. 18, 2002

(54) LAUNDRY DETERGENT COMPOSITIONS WITH AMINO ACID BASED POLYMERS TO PROVIDE APPEARANCE AND INTEGRITY BENEFITS TO FABRICS LAUNDERED THEREWITH

(75) Inventors: Sherri Lynn Randall, Hamilton; Rajan Keshav Panandiker, West Chester; Eugene Paul Gosselink, Cincinnati, all of OH (US); Bernhard Mohr, Schwabisch Hall; Dieter Boeckh, Limburgerhof, both of (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/485,247

(22) PCT Filed: Aug. 7, 1998

(86) PCT No.: PCT/US98/16536

§ 371 (c)(1),
(2), (4) Date: Feb. 7, 2000

(87) PCT Pub. No.: WO99/07814

PCT Pub. Date: Feb. 18, 1999

Related U.S. Application Data

(60) Provisional application No. 60/055,152, filed on Aug. 8, 1997.

(51) Int. Cl.[7] ............................. C11D 3/37; C11D 15/00
(52) U.S. Cl. ....................................... 510/499; 510/480
(58) Field of Search ................................. 510/360, 499, 510/480

(56) References Cited

U.S. PATENT DOCUMENTS

| | | | | |
|---|---|---|---|---|
| 4,897,220 A | * | 1/1990 | Trieselt et al. | 252/546 |
| 5,028,689 A | | 7/1991 | Heinz et al. | 528/328 |
| 5,531,934 A | * | 7/1996 | Freeman et al. | 252/390 |
| 5,540,863 A | | 7/1996 | Wood et al. | 510/356 |
| 5,665,693 A | | 9/1997 | Kroner et al. | 510/476 |
| 5,747,635 A | | 5/1998 | Kroner et al. | 528/328 |
| 5,925,728 A | * | 7/1999 | Kim et al. | 528/328 |
| 6,214,786 B1 | * | 4/2001 | Randall et al. | 510/499 |

FOREIGN PATENT DOCUMENTS

| | | | |
|---|---|---|---|
| EP | 454126 | 10/1991 | C11D/3/37 |
| JP | 06279791 | 10/1994 | C11D/10/06 |
| JP | 07166200 | 6/1995 | C11D/10/02 |
| JP | 09176689 | 7/1997 | C11D/3/48 |
| WO | WO 94/01486 | 1/1994 | C08G/69/10 |
| WO | WO 94/24254 | 10/1994 | C11D/3/37 |
| WO | WO 95/09638 | 4/1995 | A61K/31/785 |

* cited by examiner

*Primary Examiner*—Mark Kopec
*Assistant Examiner*—John M Petruncio
(74) *Attorney, Agent, or Firm*—James F. McBride; Richard S. Echler, Sr.; C. Brant Cook

(57) ABSTRACT

Modified polyaspartic acids are obtained by polycondensing (a) 1 to 99.9 mol % aspartic acid with (b) 99 to 0.1 mol % fatty acids, polybasic carboxylic acids, anhydrides of polybasic carboxylic acids, polybasic hydroxycarboxylic acids, monobasic poly-hydroxycarboxylic acids, alcohols, amines, alkoxylated alcohols and amines, amino sugars, carbohydrates, sugar carboxylic acids and/or non-proteinogenic aminocarboxylic acids, or by polymerizing monoethylenically unsaturated monomers in the presence of polyaspartic acids, in the manner of radically initiated graft copolymerization. Also disclosed is a process for preparing these modified polyaspartic acids, as well as the use of these modified polyaspartic acids as additives to washing and cleaning agents, as water conditioning agents and as deposit inhibitors during the condensation of sugar juice.

15 Claims, No Drawings

LAUNDRY DETERGENT COMPOSITIONS WITH AMINO ACID BASED POLYMERS TO PROVIDE APPEARANCE AND INTEGRITY BENEFITS TO FABRICS LAUNDERED THEREWITH

This application claims priority from provisional application No. 60/055,152, filed Aug. 8, 1997.

TECHNICAL FIELD

The present invention relates to compositions, in either liquid or granular form, for use in laundry applications, wherein the compositions comprise certain amino acid based polymer, oligomer or copolymer materials which impart appearance and integrity benefits to fabrics and textiles laundered in washing solutions formed from such compositions.

BACKGROUND OF THE INVENTION

It is, of course, well known that alternating cycles of using and laundering fabrics and textiles, such as articles of worn clothing and apparel, will inevitably adversely affect the appearance and integrity of the fabric and textile items so used and laundered. Fabrics and textiles simply wear out over time and with use. Laundering of fabrics and textiles is necessary to remove soils and stains which accumulate therein and thereon during ordinary use. However, the laundering operation itself, over many cycles, can accentuate and contribute to the deterioration of the integrity and the appearance of such fabrics and textiles.

Deterioration of fabric integrity and appearance can manifest itself in several ways. Short fibers are dislodged from woven and knit fabric/textile structures by the mechanical action of laundering. These dislodged fibers may form lint, fuzz or "pills" which are visible on the surface of fabrics and diminish the appearance of newness of the fabric. Further, repeated laundering of fabrics and textiles, especially with bleach-containing laundry products, can remove dye from fabrics and textiles and impart a faded, worn out appearance as a result of diminished color intensity, and in many cases, as a result of changes in hues or shades of color.

Given the foregoing, there is clearly an ongoing need to identify materials which could be added to laundry detergent products that would associate themselves with the fibers of the fabrics and textiles laundered using such detergent products and thereby reduce or minimize the tendency of the laundered fabric/textiles to deteriorate in appearance. Any such detergent product additive material should, of course, be able to benefit fabric appearance and integrity without unduly interfering with the ability of the laundry detergent to perform its fabric cleaning function. The present invention is directed to the use of amino acid based polymer, oligomer or copolymer materials in laundry applications which perform in this desired manner.

SUMMARY OF THE INVENTION

Amino acid based polymer, oligomer or copolymer materials which are suitable for use in laundry operations and provide the desired fabric appearance and integrity benefits can be characterized by the following general formula:

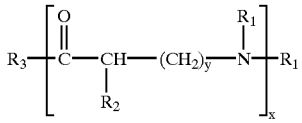

wherein the polymer, oligomer, or copolymer contains at least about 5 mole %, preferably at least about 10 mole %, more preferably from about 20 mole %, and most preferably at least about 40 mole %, of a basic amino acid;

each $R_1$ is selected from the group consisting of H, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl, and $C_7$–$C_{18}$ alkylaryl;

each $R_2$ is independently selected from the group consisting of H, $NH_2$,

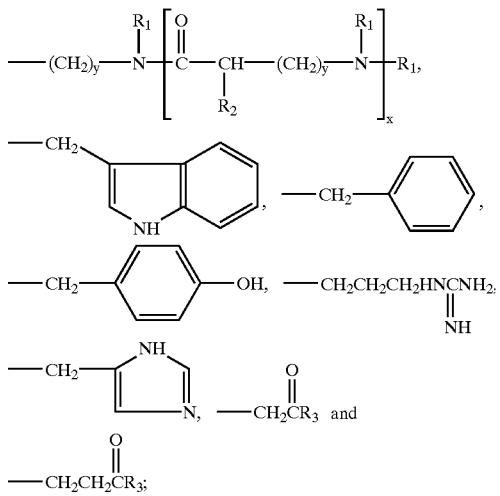

each $R_3$ is independently selected from the group consisting of OH, OM, $N(R_1)_2$,

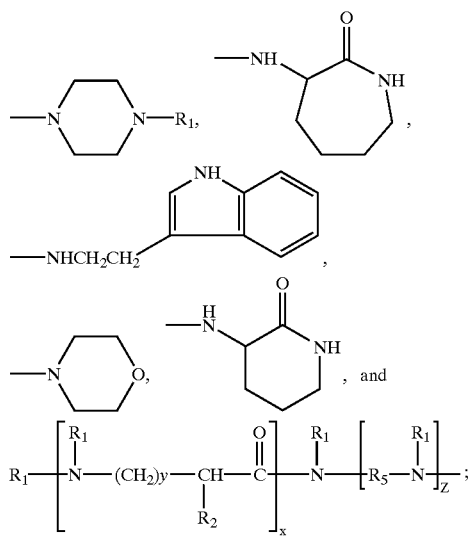

each $R_5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, $C_3$–$C_{12}$ cyclic oxa-substituted alkylene, and

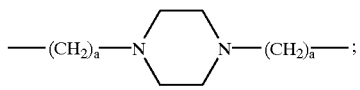

wherein:
each x is independently from 0 to about 200;
each y is independently from 0 to about 10, preferably y is 0, 3, or 4, and most preferably y is 4;
each z is independently from 1 to about 7;
each a is independently from about 1 to about 12;
M is selected from compatible cations; and
provided that:
the sum of all x's is from 2 to about 200, preferably from about 3 to about 150, more preferably from about 5 to about 120, and most preferably from about 5 to about 100;
any basic amine site on the polymer, oligomer, or copolymer may be optionally protonated, alkylated, or quaternized with groups selected from the group consisting of H, $CH_3$, alkyl, hydroxyalkyl, benzyl and mixtures thereof;
any amine site may be optionally alkoxylated; and
when two $R_1$ groups are attached to a common nitrogen the two $R_1$s may form a cyclic structure selected from the group consisting of $C_5$–$C_8$ alkylene, and $C_4$–$C_7$ alkyleneoxyalkylene.

The amino acid based polymer, oligomer or copolymer materials defined above can be used as a washing solution additive in either granular or liquid form. Alternatively, they can be admixed to granular detergents, dissolved in liquid detergent compositions or added to a fabric softening composition. Preferably the fabric treatment compositions of this invention comprise from about 0.1% to about 10%, preferably from about 0.2% to about 8%, more preferably from about 0.3% to about 6%, and most preferably from about 0.4% to about 5%, by weight of a mixture of the amino acid based polymers, oligomers or copolymers defiened by the general formula above. The forgoing description of uses for the amino acid based fabric treatment materials defined herein are intended to be exemplary and other uses will be apparent to those skilled in the art and are intended to be within the scope of the present invention.

The laundry detergent compositions herein comprise from about 1% to 80% by weight of a detersive surfactant, from about 0.1% to 80% by weight of an organic or inorganic detergency builder and from about 0.1% to 5% by weight of the amino acid based fabric treatment materials of the present invention. The detersive surfactant and detergency builder materials can be any of those useful in conventional laundry detergent products.

Aqueous solutions of the amino acid based polymer, oligomer or copolymer materials of the subject invention comprise from about 0.1% to 50% by weight of the amino acid based fabric treatment materials dissolved in water and other ingredients such as stabilizers and pH adjusters.

In its method aspect, the present invention relates to the laundering or treating of fabrics and textiles in aqueous washing or treating solutions formed from effective amounts of the detergent compositions described herein, or formed from the individual components of such compositions. Laundering of fabrics and textiles in such washing solutions, followed by rinsing and drying, imparts fabric appearance benefits to the fabric and textile articles so treated. Such benefits can include improved overall appearance, pill/fuzz reduction, antifading, improved abrasion resistance, and/or enhanced softness.

DETAILED DESCRIPTION OF THE INVENTION

As noted, when fabric or textiles are laundered in wash solutions which comprise the amino acid based polymer, oligomer or copolymer materials of the present invention fabric appearance and integrity are enhanced. The amino acid based fabric treatment materials can be added to wash solutions by incorporating them into a detergent composition, a fabric softener or by adding them separately to the washing solution. The amino acid based fabric treatment materials are described herein primarily as liquid or granular detergent additives but the present invention is not meant to be so limited. The amino acid based fabric treatment materials, detergent composition components, optional ingredients for such compositions, and methods of using such compositions, are described in detail below. All percentages are by weight unless other specified.

A) Amino Acid Based Polymer Oligomer or Copolymer Materials

The essential component of the compositions of the present invention comprises one or more amino acid based polymer, oligomer or copolymer. Such materials have been found to impart a number of appearance benefits to fabrics and textiles laundered in aqueous washing solutions formed from detergent compositions which contain such amino acid based fabric treatment materials. Such fabric appearance benefits can include, for example, improved overall appearance of the laundered fabrics, reduction of the formation of pills and fuzz, protection against color fading, improved abrasion resistance, etc. The amino acid based fabric treatment materials used in the compositions and methods herein can provide such fabric appearance benefits with acceptably little or no loss in cleaning performance provided by the laundry detergent compositions into which such materials are incorporated.

The amino acid based polymer, oligomer or copolymer component of the compositions herein may comprise combinations of these amino acid based materials. For example, a mixture of lysine and hexamethylenediamine condensates can be combined with a mixture of lysine and octylamine condensates to achieve the desired fabric treatment results. Moreover, the molecular weight of amino acid based fabric treatment materials can vary within the mixture as is illustrated in Example I below.

As will be apparent to those skilled in the art, an oligomer is a molecule consisting of only a few monomer units while polymers comprise considerably more monomer units. For the present invention, oligomers are defined as molecules having an average molecular weight below about 1,000 and polymers are molecules having an average molecular weight of greater than about 1,000. Copolymers are polymers or oligomers wherein two or more dissimilar monomers have been simultaneously or sequentially polymerized. Copolymers of the present invention can include, for example, polymers or oligomers polymerized from a mixture of a primary amino acid based monomer, e.g., lysine, and a secondary amino acid monomer, e.g., tryptophan.

The amino acid based fabric treatment component of the detergent compositions herein will generally comprise from about 0.1% to about 10%, preferably from about 0.2% to about 8%, more preferably from about 0.3% to about 6%, and most preferably from about 0.4% to about 5%, by weight of a mixture of the amino acid based polymers, oligomers or copolymers defiened by the general formula below. But when used as a washing solution additive, i.e. when the amino acid based fabric treatment component is not incorporated into a detergent composition, the concentration of the amino acid based component can comprise from about 0.1% to about 50% by weight of the additive material.

One suitable group of amino acid based polymer, oligomer or copolymer materials for use herein is characterized by the following formula:

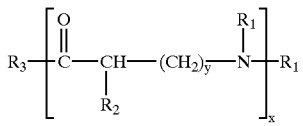

wherein the polymer, oligomer, or copolymer contains at least about 5 mole %, preferably at least about 10 mole %, more preferably from about 20 mole %, and most preferably at least about 40 mole %, of a basic amino acid;

- each $R_1$ is selected from the group consisting of H, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl, and $C_7$–$C_{18}$ alkylaryl;
- each $R_2$ is independently selected from the group consisting of H, $NH_2$,

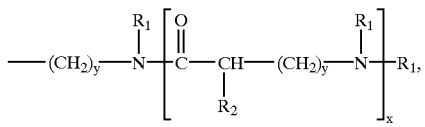

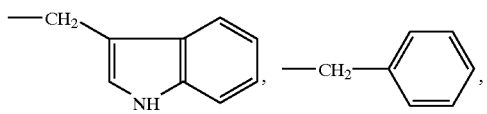

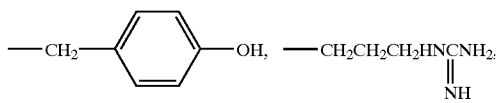

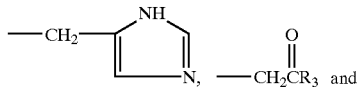

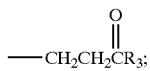

each $R_3$ is independently selected from the group consisting of OH, OM, $N(R_1)_2$,

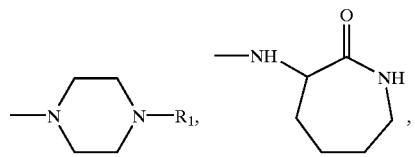

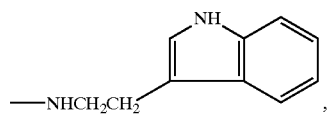

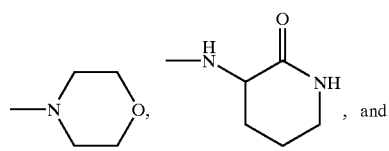

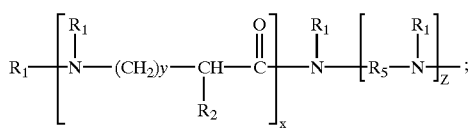

each $R_5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, $C_3$–$C_{12}$ cyclic oxa-substituted alkylene, and

wherein:
each x is independently from 0 to about 200;
each y is independently from 0 to about 10;
each z is independently from 1 to about 7;
each a is independently from about 1 to about 12;
M is selected from compatible cations; and
provided that:
the sum of all x's is from 2 to about 200, preferably from about 3 to about 150, more preferably from about 5 to about 120, and most preferably from about 5 to about 100;
any basic amine site on the polymer, oligomer, or copolymer may be optionally protonated, alkylated, or quaternized with groups selected from the group consisting of H, $CH_3$, alkyl, hydroxyalkyl, benzyl and mixtures thereof;
any amine site may be optionally alkoxylated; and
when two $R_1$ groups are attached to a common nitrogen the two $R_1$s may form a cyclic structure selected from the group consisting of $C_5$–$C_8$ alkylene, and $C_4$–$C_7$ alkyleneoxyalkylene.

Preferred amino acid based polymer, oligomer or copolymer materials for use herein include lysine and hexamethylenediamine condensates of the general formula:

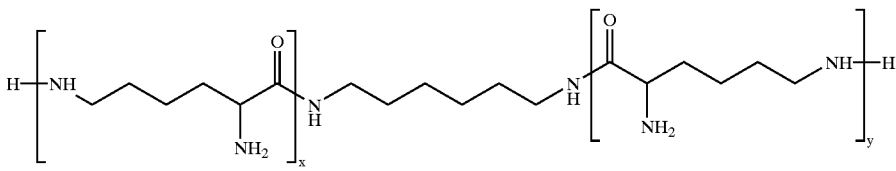

wherein x and y are individually from 0 to about 50, provided that x+y>0. As is illustrated in Example I below, the lysine and hexamethylenediamine condensates of the present invention are often a mixture of various molecules having different values for x+y. Especially preferred lysine and hexamethylenediamine condensates have x+y equal to from about 2 to about 5. The above, simplified structure depiction is meant to include also those oligomers and polymers with more branching which arise from amide bond linkages formed at the alpha aimino group and from amide bond linkages formed at both amino groups of a single lysine-derived unit.

Compositions which are also preferred for use herein are lysine and octylamine condensates of the general formula:

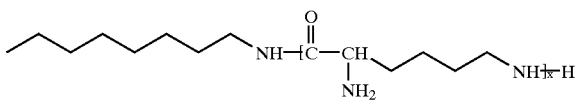

wherein x is from about 1 to about 50.

Additionally preferred compositions for use herein are lysine and tryptophan condensates of the general formula:

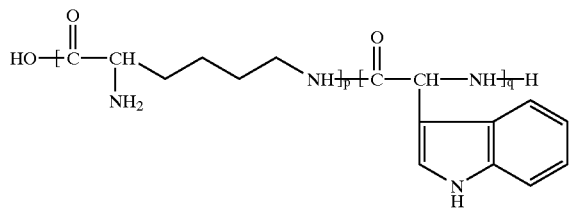

Wherein p and q independently are from about 1 to about 50.

Synthesis of the amino acid based polymer, oligomer or copolymer materials defined herein will be apparent to those skilled in the art in light of Example I wherein the synthesis of 5:1, L-Lysine: 1,6-Hexanediamine is exemplified. Example I details the condensation reaction of lysine and hexanediamine which produces a preferred product for achieving the desired fabric appearance and integrity benefits of the present invention. However, other amines are equally suitable for condensation reactions with amino acids such as lysine, and those suitable amines which are readily available and/or possess interesting structural characteristics include:

aliphatic and cycloaliphatic amines, preferably methylamine, ethylamine, proplyamine, butylamine, pentylamine, hexylamine, heptylamine, ethylhexylamine, octylamine, nonylamine, decylamine, undecylamine, dodecylamine, tridecylamine, stearylamine, palmitylamine, 2-ethylhexylamine, isononylamine, hexamethyleneimine, dimethylamine, diethylamine, dipropylamine, dibutylamine, dihexylamine, ditridecylamine, N-methylbutylamine, N-ethylbutylamine;

alkoxyalkylamines, preferably 2-methoxyethylamine, 2-ethoxyethylamine, 3-methoxypropylamine, 3-ethoxypropylamine, 3-[(2-ethylhexyl)oxy]-1-propanamine, 3-(2-methoxyethoxy)-1-propanamine, 2-methoxy-N-(2-methoxyethyl)ethanamine;

alicyclic amines, preferably cyclopentylamine, cyclohexylamine, N-methycyclohexylamine, N-ethylcyclohexylamine, dicyclohexylamine;

diamines, triamines and tetramines, preferably ethylenediamine, propylenediamine, butylenediamine, neopentyldiamine, hexamethylenediamine, octamethylenediamine, imidazole, 5-amino-1,3,-trimethylcyclohexylmethylamine, 4,4'-methylenebiscyclohexylamine, 4,4'-methylenebis(2-methylcyclohexylamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino)propylamine, 3-(cyclohexylamino)propylamine, 3-(2-aminoethyl) aminopropylamine, 2-(diethylamino)ethylamine, 3-(dimethylamino)propylamine;

dimethyldipropylenetriamine, 4-aminomethyloctane-1,8-diamine, 3-(diethylamino)propylamine, N,N-diethyl-1,4-pentanediamine, diethylenetriamine, dipropylenetriamine, bis(hexamethylene)triamine, aminoethylpiperazine, aminopropylpiperazine, N,N-bis(aminopropyl)methylamine, N,N-bis(aminopropyl)ethylamine, N,N-bis(aminoproply)methylamine, N,N-bis(aminopropyl)ethylamine, N,N-bis(aminopropyl)hexylamine, N,N-bis(aminopropyl)octylamine, N,N-dimethyldipropylenetriamine, N,N-bis(3-dimethylaminopropyl)amine, N,N"-1,2-ethanediylbis-(1,3-propanediamine), N-(aminoethyl)piperazine, N-(2-imidazole)piperazine, N-ethylpiperazine, N-(hydroxyethyl)piperazine, N-(aminoethyl)piperazine, N-(aminopropyl)piperazine, N-(aminoethyl)morpholine, N-(aminopropyl)morpholine, N-(aminoethyl)imidazole, N-(aminopropyl)imidazole, N-(aminoethyl)hexamethylenediamine, N-(aminopropyl)hexamethylenediamine, N-(aminoethyl)ethylenediamine, N-(aminopropyl)ethylenediamine, N-(aminoethyl)butylenediamine, N-(aminopropyl)butylenediamine, bis(aminoethyl)piperazine, bis(aminopropyl)piperazine, bis(aminoethyl)hexamethylenediamine, bis(aminopropyl)hexamethylenediamine, bis(aminoethyl)ethylenediamine, bis(aminopropyl)ethylenediamine, bis(aminoethyl)butylenediamine, bis(aminopropyl)butylenediamine;

aliphatic amino alcohols, preferably 2-aminoethanol, 3-amino-1propanol, 1-amino-2-propanol, 2-(2-aminoethoxy)ethanol, 2-[(2-aminoethyl)amino]ethanol, 2-methylaminoethanol, 2-(ethylamino)ethanol, 2-butylaminoethanol, diethanolamine, 3-[(2-hydroxyethyl)amino]-1-propanol, diisopropanolamine, bis(hydroxyethyl)aminoethylamine, bis(hydroxypropyl)aminoethylamine, bis(hydroxyethyl)aminopropylamine, bis(hydroxypropyl)aminopropylamine;

monoamino carboxylic acids, preferably glycine, alanine, sarcosine, asparagine, glutamine, 6-aminocaproic acid, caprolactam, 4-aminobutyric acid; and glucosamine, melamine, urea, guanidine, polyguanides, piperidine, morpholine, 2,6-dimethylmorpholine.

B) Detersive Surfactant

The detergent compositions herein comprise from about 1% to 80% by weight of a detersive surfactant. Preferably such compositions comprise from about 5% to 50% by weight of surfactant. Detersive surfactants utilized can be of the anionic, nonionic, zwitterionic, amnpholytic or cationic type or can comprise compatible mixtures of these types. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. All of these patents are incorporated herein by reference. Of all the surfactants, anionics and nonionics are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ammonium alkyl sulfates, especially those obtained by sulfating the higher alcohols ($C_8$–$C_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11-13}$ LAS.

Preferred nonionic surfactants are those of the formula $R_1(OC_2H_4)_nOH$, wherein $R_1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$C_{13}$ alcohol condensed with about 6.5 moles of ethylene oxide per mole of alcohol.

Additional suitable nonionic surfactants include polyhydroxy fatty acid amides of the formula:

wherein R is a $C_{9-17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798, the disclosures of which are incorporated herein by reference.

Preferred surfactants for use in the detergent compositions described herein are amine based surfactants of the general formula:

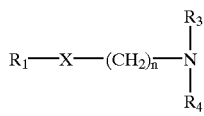

wherein $R_1$ is a $C_6$–$C_{12}$ alkyl group; n is from about 2 to about 4, X is a bridging group which is selected from NH, CONH, COO, or O or X can be absent; and $R_3$ and $R_4$ are individually selected from H, $C_1$–$C_4$ alkyl, or ($CH_2$—$CH_2$—$O(R_5)$) wherein $R_5$ is H or methyl. Especially preferred amines based surfactants include the following:

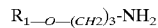

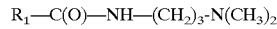

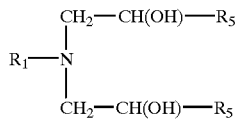

wherein $R_1$ is a $C_6$–$C_{12}$ alkyl group and $R_5$ is H or $CH_3$. Particularly preferred amines for use in the surfactants defined above include those selected from the group consisting of octyl amine, hexyl amine, decyl amine, dodecyl amine, $C_8$–$C_{12}$ bis(hydroxyethyl)amine, $C_8$–$C_{12}$ bis(hydroxyisopropyl)amine, $C_8$–$C_{12}$ amido-propyl dimethyl amine, or mixtures thereof.

In a highly preferred embodiment, the amine based surfactant is described by the formula:

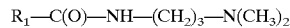

wherein $R_1$ is $C_8$–$C_{12}$ alkyl.

C) Detergent Builder

The detergent compositions herein may also comprise from about 0.1% to 80% by weight of a detergent builder. Preferably such compositions in liquid form will comprise from about 1% to 10% by weight of the builder component. Preferably such compositions in granular form will comprise from about 1% to 50% by weight of the builder component. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the oxydisuccinates and the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also discussed in U.S. Pat. No. 4,605,509 are crystalline layered silicates which are suitable for use in the detergent compositions of this invention.

D) Optional Detergent Ingredients

In addition to the surfactants, builders and amino acid based polymer, oligomer or copolymer materials hereinbefore described, the detergent compositions of the present invention can also include any number of additional optional ingredients. These include conventional detergent composition components such as enzymes and enzyme stabilizing agents, suds boosters or suds suppressers, anti-tarnish and anticorrosion agents, soil suspending agents, soil release agents, germicides, pH adjusting agents, non-builder alkalinity sources, chelating agents, organic and inorganic fillers, solvents, hydrotropes, optical brighteners, dyes and perfumes.

pH adjusting agents may be necessary in certain applications where the pH of the wash solution is greater than about 10.0 because the fabric integrity benefits of the defined compositions begin to diminish at a higher pH. Hence, if the wash solution is greater than about 10.0 after the addition of the amino acid based polymer, oligomer or copolymer materials of the present invention a pH adjuster should be used to reduce the pH of the washing solution to below about 10.0, preferably to a pH of below about 9.5 and most preferably below about 7.5. Suitable pH adjusters will be known to those skilled in the art.

Normally, a preferred optional ingredient for incorporation into detergent compositions is a bleaching agent, e.g., a peroxygen bleach. However, many common bleaching agents will degrade some, but not all, of the amino acid based fabric treatment materials of the present invention. Hence, before adding a bleaching agent to a detergent composition comprising an amino acid based fabric treatment material as defined herein compatibility between the bleaching agent and the amino acid based fabric treatment material must be investigated.

Another highly preferred optional ingredient in the detergent compositions herein is a detersive enzyme component. While it is known that some enzymes will degrade the peptide bonds of amino acids, the amino acid based polymer, oligomer or copolymer materials defined herein do not exhibit such degradation in the presence of enzymes. Hence, enzymes can be added to detergent compositions which comprise the amino acid based fabric treatment materials of the present invention with substantially no degradation.

Enzymes can be included in the present detergent compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability, optimal thermostability, and stability to active detergents, builders and the like. In this respect bacterial or fungal enzymes are preferred, such as bacterial amylases and proteases, and fungal cellulases. "Detersive enzyme", as used herein, means any enzyme having a cleaning, stain removing or otherwise beneficial effect in a laundry detergent composition. Preferred enzymes for laundry purposes include, but are not limited to, proteases, cellulases, lipases, amylases and peroxidases.

Enzymes are normally incorporated into detergent compositions at levels sufficient to provide a "cleaning-effective amount". The term "cleaning-effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may be desirable in highly concentrated detergent formulations.

Suitable examples of proteases are the subtilisins which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

Cellulases usable herein include both bacterial and fungal types, preferably having a pH optimum between 5 and 10. U.S. Pat. No. 4,435,307, Barbesgoard et al., Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, *Dolabella Auricula Solander*. Suitable cellulases are also disclosed in GB-A-2.075.028; GB-A-2.095.275 and DE-OS-2.247.832. CAREZYME® and CELLUZYME® (Novo) are especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also, the lipase in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum*, e.g. *Chromobacter viscosum var. lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPOLASE® enzyme derived from *Humicola lanuginosa* and commercially available from Novo, see also EP 341,947, is a preferred lipase for use herein.

The enzyme-containing compositions herein may optionally also comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

E) Detergent Composition Preparation

The detergent compositions according to the present invention can be in liquid, paste or granular form. Such compositions can be prepared by combining the essential and optional components in the requisite concentrations in any suitable order and by any conventional means.

Granular compositions, for example, are generally made by combining base granule ingredients, e.g., surfactants, builders, water, etc., as a slurry, and spray drying the resulting slurry to a low level of residual moisture (5–12%). The remaining dry ingredients, e.g., granules of the essential amino acid based fabric treatment materials, can be admixed in granular powder form with the spray dried granules in a rotary mixing drum. The liquid ingredients, e.g., solutions of the essential amino acid based fabric treatment materials, enzymes, binders and perfumes, can be sprayed onto the resulting granules to form the finished detergent composition. Granular compositions according to the present invention can also be in "compact form", i.e. they may have a relatively higher density than conventional granular detergents, i.e. from 550 to 950 g/l. In such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt.

Liquid detergent compositions can be prepared by admixing the essential and optional ingredients thereof in any desired order to provide compositions containing components in the requisite concentrations. Liquid compositions according to the present invention can also be in "compact form", in such case, the liquid detergent compositions according to the present invention will contain a lower amount of water, compared to conventional liquid detergents. Addition of the amino acid based polymer, oligomer or copolymer materials to liquid detergent or other aqueous compositions of this invention may be accomplished by simply mixing into the liquid solutions the desired amino acid based fabric treatment materials.

F) Fabric Laundering Method

The present invention also provides a method for laundering fabrics in a manner which imparts fabric appearance benefits provided by the amino acid based polymer, oligomer or copolymer materials used herein. Such a method employs contacting these fabrics with an aqueous washing solution formed from an effective amount of the detergent compositions hereinbefore described or formed from the individual components of such compositions. Contacting of fabrics with washing solution will generally occur under conditions of agitation although the compositions of the present invention may also be used to form aqueous unagitated soaking solutions for fabric cleaning and treatment. As discussed above, it is preferred that the washing solution have a pH of less than about 10.0, preferably it has a pH of about 9.5 and most preferably it has a pH of about 7.5.

Agitation is preferably provided in a washing machine for good cleaning. Washing is preferably followed by drying the wet fabric in a conventional clothes dryer. An effective amount of a high density liquid or granular detergent composition in the aqueous wash solution in the washing machine is preferably from about 500 to about 7000 ppm, more preferably from about 1000 to about 3000 ppm.

G) Fabric Conditioning

The amino acid based polymer, oligomer or copolymer materials hereinbefore described as components of the laundry detergent compositions herein may also be used to treat and condition fabrics and textiles in the absence of the surfactant and builder components of the detergent composition embodiments of this invention. Thus, for example, a fabric conditioning composition comprising only the amino acid based fabric treatment materials themselves, or comprising an aqueous solution of the amino acid based fabric treatment materials, may be added during the rinse cycle of a conventional home laundering operation in order to impart the desired fabric appearance and integrity benefits hereinbefore described.

EXAMPLES

The following examples illustrate the compositions and methods of the present invention, but are not necessarily meant to limit or otherwise define the scope of the invention.

Example I

The synthesis of an amino acid based polymer, specifically, 5:1 molar ratio of L-Lysine: 1,6-Hexanediamine, is exemplified below. As used herein, unless otherwise stated, all ratios are molar ratios of the initial reactants, i.e., monomers. More specifically, L-lysine (supplied by Aldrich, 1078.7 g, 7.38 moles), 1,6-hexanediamine (supplied by Aldrich, 171.5 g, 1.48 moles), and propylene glycol (supplied by Baker, approximately 1 L) are added to a 5L, three neck, round bottom flask which is equipped with a magnetic stirring bar, modified Claisen head, condenser (set for distillation), thermometer, and temperature controller (Therm-O-Watch, $I^2R$). The solution is blanketed with argon and heated at 170° C. for 4 hrs as water distills from the reaction. A $^{13}$C-NMR (D$_2$O) shows the emergence of a peak at approximately 177 ppm which corresponds to an amide product. A smaller peak at approximately 181 ppm may represent some unreacted L-lysine. The bulk solution is then divided into six 1L round bottom flasks, and each flask is heated on a Kugelrohr apparatus (Aldrich) at approximately 170° C. and approximately 2 mm Hg for 3 hrs to remove solvent and volatile products. The flasks are cooled to room temperature to afford 915 g of dark brown, thick liquid. A $^{13}$C-NMR (D$_2$O) shows that the peak at approximately 181 ppm has virtually disappeared. The material is dissolved in water and adjusted to a pH of approximately 7.5 with methanesulfonic acid to form about a 23% stock solution.

A typical mass spectrometry analysis of the resulting solution is given below. As can be seen, the resulting material is a mixture of lysine/hexamethylenediamine condensates having various molecular weights and molar ratios. Moreover, the mixture can comprise from about 0.1% to about 85% by weight of high molecular weight polymers, in this case polylysine having a molecular weight of greater than about 1,000. Table I below lists only the lower molecular weight oligomers. The "% of mixture" is the percent by weight of the specified molecule based on the total weight of the low molecular weight oligomers, i.e., the higher molecular weight polylysine has been excluded from the weight calculations.

TABLE I

| MW | Assignment | % of mixture |
|---|---|---|
| 117 | HMDA starting material | 2 |
| 129 | lysine starting material that lost water | 32 |
| 245 | X + Y = 1 | 22 |
| 373 | X + Y = 2 | 28 |
| 501 | X + Y = 3 | 12 |
| 629 | X + Y = 4 | 4 |

Example II

Condensation of L-lysine and epsilon-caprolactam in a molar ratio of 1:1 684 g of a 50% aqueous solution of L-lysine (365.2 g, 2.5 mol), epsilon-caprolactam (282.9 g, 2.5 mol), and 1 g sodium hypophosphite are placed in a 2 l reaction vessel equipped with an efficient stirrer and distillation head. The solution is heated under a constant stream of nitrogen to 160° C. for 8 h as water distills from the reaction. Following this, a water pump vacuum is applied for 1 h to remove residual amounts of solvent and volatile products. The reddish, slightly viscous melt is cooled to 125° C. and 400 g water are added slowly to result in a clear orange solution. This solution is further cooled to room temperature to give a low viscous liquid. 500 g of this solution is adjusted to a pH of approximately 7.5 with concentrated sulfuric acid 846 g to form an 53.7% stock solution. The molecular weight of this polymer is determined to be M$_w$=3990.

Example III

Condensation of L-lysine and aminocaproic acid in a molar ratio of 1:1 719 g of a 60% aqueous solution of L-lysine (382.7 g, 2.62 mol), aminocaproic acid (344.8 g, 2.62 mol), and 1 g sodium hypophosphite are placed in a 2 l reaction vessel equipped with an efficient stirrer and distillation head. The solution is heated under a constant stream of nitrogen to 170° C. for 6 h as water distills from the reaction. Following this, a water pump vacuum is applied for 1 h to remove residual amounts of solvent and volatile products. The reddish, slightly viscous melt is cooled to 140° C. and 250 g water is added slowly to result in a clear orange solution. This solution is further cooled to room temperature to give al low viscous liquid. 500 g of this solution is adjusted to a pH of approximately 7.5 with concentrated sulfuric acid (46 g) to form about 65.7% stock solution. The molecular weight of this polymer is determined to be M$_w$=2480.

Example IV

Condensation of L-lysine and aminocaproic acid in a molar ratio of 1:1 L-lysine monohydrate (656.8 g, 4.0 mol), aminocaproic acid (524.7 g, 4.0 mol) and sodium hypophosphite (0.1 g) are placed in a pressurizable 2.5 l reaction vessel and blanketed with nitrogen. The reaction vessel is then sealed pressure tight and heated to 200° C. for 7 h, during which time the internal pressure rises to 7.65 bar. The pressure is then slowly released to atmospheric pressure to remove water from the reaction mixture. The reaction is then continued for 30 min at 180° C. and atmospheric pressure. The material solidifies upon cooling to ambient temperature. An aliquot of this material is dissolved in water and adjusted to a pH of approximately 7.5 with concentrated sulfuric acid to form an approx. 54% stock solution. The molecular weight of the polymer is determined to be M$_w$=3550.

Example V

Condensation of L-lysine and aminocaproic acid in molar ratio of 1:1 124.8 g of a 60% aqueous solution of L-lysine monohydrate (74.9 g, 0.46 mol), aminocaproic acid (59.8 g, 0.46 mol) and sodium hypophosphite (0.1 g) are placed in a pressurizable 0.5 l reaction vessel and blanketed with nitrogen. The reaction vessel is then sealed pressure tight and heated to 167° C. for 4 h, during which time the internal pressure rises to 3.1 bar. The pressure is then slowly released to atmospheric pressure to remove water from the reaction mixture. The reaction is then continued for 3 h at 170° C. at atmospheric pressure. The orange, slightly viscous melt is cooled to room temperature and 100 ml water is added to form a yellow solution. This solution is adjusted to a pH of approximately 7.5 with concentrated sulfuric acid (15 mL) to form and approx. 54% stock solution. The molecular weight of the polymer is determined to be M$_w$=740.

Example VI

Condensation of L-lysine and octylamine in a molar ratio of 3:1 L-lysine monohydrate (656.8 g, 4.0 mol), octylamine (524.7 g, 1.33 mol) and sodium hypophosphite (0.1 g) are placed in a pressurizable 2.5 l reaction vessel and blanketed with nitrogen. The reaction vessel is then sealed pressure tight and heated to 200° C. for 7 h, during which time the internal pressure rises to 10.90 bar. The pressure is then slowly released to atmospheric pressure to remove volatile materials from the reaction mixture. The reaction is then continued for 30 min at 180° C. and atmospheric pressure. Water (700 mL) is added to the reaction mixture upon cooling to room temperature. An aliquot of this solution is adjusted to a pH of approximately 7.5 with concentrated sulfuric acid to form an approx. 50% stock solution. The molecular weight of the polymer is determined to be M$_w$=850.

Example VII

Base liquid and granular detergent compositions were prepared. Various amino acid based polymer, oligomer or copolymer materials were added to the base detergent compositions as described below.

Liquid Detergent Test Composition Preparation

Several heavy duty liquid detergent compositions are prepared containing various amino acid based polymer, oligomer or copolymer materials as described in claim 1. Such liquid detergent compositions all have the following basic formula:

TABLE VII

| Component | Wt. % |
|---|---|
| $C_{12-15}$ alkyl ether (2.5) sulfate | 19 |
| $C_{12-13}$ alkyl ethoxylate (9.0) | 2 |
| $C_{12-14}$ glucose amide | 3.5 |
| Citric Acid | 3 |
| $C_{12-14}$ Fatty Acid | 2 |
| MEA | to pH 8 |
| Ethanol | 3.4 |
| Propanediol | 6.5 |
| Borax | 2.5 |
| Dispersant | 1.2 |
| Na Toluene Sulfonate | 2.5 |
| Amino Acid Based Fabric Treatment Materials as shown in Table XI | See Table XI |
| Dye, Perfume, Brighteners, Enzymes, Preservatives, Suds Suppressor, Other Minors, Water | Balance |
| | 100% |

Example X

Granular Detergent Test Composition Preparation

Several granular detergent compositions are prepared containing various amino acid based polymer, oligomer or copolymer materials. Such granular detergent compositions all have the following basic formula:

| Component | Wt. % |
|---|---|
| $C_{12}$ Linear alkyl benzene sulfonate | 9 |
| $C_{14-15}$ alkyl sulfonate | 13 |
| Zeolite Builder | 28 |
| Sodium Carbonate | 27 |
| PEG 4000 | 1.6 |
| Dispersant | 2.3 |
| $C_{12-13}$ alkyl ethoxylate (E9) | 1.5 |
| Sodium Perborate | 1.0 |
| Soil Release Polymer | 0.4 |
| Enzymes | 0.6 |
| Amino Acid Based Fabric Treatment Materials as shown in Table XI | See Table XI |
| Perfume, Brightener, Suds Suppressor, Other Minors, Moisture, Sulfate | Balance |
| | 100% |

Example XI

TABLE XI

| | Example Compositions | |
|---|---|---|
| Polymer | Polymer level | Detergent Form |
| Lysine/HMDA* 5:1 condensate | 0.5% | liquid |
| Lysine/HMDA 5:1 condensate | 0.75% | liquid |
| Lysine/HMDA 5:1 condensate | 1.00% | liquid |
| Lysine/HMDA 5:1 condensate | 2.00% | liquid |
| Lysine/HMDA 10:1 condensate | 2.00% | liquid |
| Lysine/HMDA 3:1 condensate | 2.00% | liquid |
| Polylysine | 2.00% | liquid |
| Lysine/HMDA 5:1 condensate | 2.00% | powder |
| Lysine/HMDA 5:1 condensate | 4.00% | powder |
| Lysine/HMDA 3:1 condensate | 2.00% | powder |
| Lysine/HMDA 1:1 | 0.75% | liquid |
| Lysine/octylamine 1:1 | 0.75% | liquid |
| Lysine/octylamine 2:1 | 0.75% | liquid |
| Lysine/octylamine 11:1 | 0.75% | liquid |
| Lysine/monoethanolamine 1:1 | 0.75% | liquid |
| Lysine/monoethanolamine 1.7:1 | 0.75% | liquid |
| Lysine/monoethanolamine 7.7:1 | 0.75% | liquid |
| Lysine/tryptamine 5:1 | 0.75% | liquid |
| Lysine/tryptophan 5:1 | 0.75% | liquid |
| Lysine/octamethylenediamine 5:1 | 0.75% | liquid |
| Lysine/diaminododecane 5:1 | 0.75% | liquid |

*HMDA = hexamethylenediamine

What is claimed is:

1. A detergent composition comprising:
   a) from 1% to 80% by weight, of a detersive surfactant selected from the group consisting of nonionic, anionic, cationic, amphoteric, zwitterionic surfactants, and mixtures thereof; and
   b) from 0.1% to 10% by weight, of an admixture of two or more oligomers, polymers or copolymers which are formed from the self-condensation of lysine or the reaction of lysine with one or more amino acids or amino acid pre-cursors selected from the group consisting of ornithine, histidine, tryptophan, a $C_2$–$C_{12}$ α,ω-amino acid, valerolactam, caprolactam, and mixtures thereof; or the reaction of lysine with one or more $C_2$–$C_{12}$ α,ω-diamines.

2. A composition according to claim 1 wherein said oligomer is a admixture formed from the reaction of from 1 to 5 equivalents of lysine with from 1 to 5 equivalents of a $C_2$–$C_{12}$ α,ω-amino acid, valerolactam, caprolactam, and mixtures thereof.

3. A composition according to claim 2 wherein said oligomer is formed from the reaction of from 1 to 5 equivalents of lysine with from 1 to 5 equivalents of 1,6-hexamethylenediamine.

4. A composition according to claim 2 wherein said oligomer is formed from the reaction of from 1 to 5 equivalents of lysine with from 1 to 5 equivalents of caprolactam.

5. A composition according to claim 1 comprising from 0.2% to 8% of said polymer, oligomer, or copolymer admixture.

6. A composition according to claim 5 comprising from 0.3% to 6% of said polymer, oligomer, or copolymer admixture.

7. A composition according to claim 6 comprising from 0.4% to 5% of said polymer, oligomer, or copolymer admixture.

8. A composition according to claim 1 wherein said said polymer, oligomer, or copolymer admixture comprisies at least 5 mole % of a basic amino acid selected from the group consisting lysine, ornithine, tryptophan, histidine, and mixtures thereof.

9. A composition according to claim 8 wherein said said polymer, oligomer, or copolymer admixture comprisies at least 10 mole % of a basic amino acid selected from the group consisting lysine, ornithine, tryptophan, histidine, and mixtures thereof.

10. A composition according to claim 9 wherein said said polymer, oligomer, or copolymer admixture comprisies at least 20 mole % of a basic amino acid selected from the group consisting lysine, ornithine, tryptophan, histidine, and mixtures thereof.

11. A composition according to claim 10 wherein said said polymer, oligomer, or copolymer admixture comprisies at least 40 mole % of a basic amino acid selected from the group consisting lysine, ornithine, tryptophan, histidine, and mixtures thereof.

12. A detergent composition comprising:
  a) from 1% to 80% by weight, of a detersive surfactant selected from the group consisting of nonionic, anionic, cationic, amphoteric, zwitterionic surfactants, and mixtures thereof; and
  b) from 0.1% to 10% by weight, of an admixture of two or more oligomers, polymers or copolymers which are formed from the polymerization of lysine and one or more polymerizable compounds selected from the group consisting of hexamethylene diamine, octylamine, nomoethanolamine, tryptamine, tryptophan, octamethylene diamine, diaminododecane, decylamine, docecylamine, and mixtures thereof.

13. A composition according to claim 12 wherein the ratio of lysine to said polymerizable compound is 10:1.

14. A composition according to claim 13 wherein the ratio of lysine to said polymerizable compound is 5:1.

15. A composition according to claim 14 wherein the ratio of lysine to said polymerizable compound is 2:1.

* * * * *

UNITED STATES PATENT AND TRADEMARK OFFICE
CERTIFICATE OF CORRECTION

PATENT NO. : 6,407,053 B1
DATED : June 18, 2002
INVENTOR(S) : Sherri Lynn Randall et al.

It is certified that error appears in the above-identified patent and that said Letters Patent is hereby corrected as shown below:

<u>Title page,</u>
Item [57], ABSTRACT, should read:
-- The present invention relates to laundry detergent compositions comprising:
a) from 1% to 80% by weight, of a detersive surfactant selected from the group consisting of nonionic, anionic, cationic, amphoteric, zwitterionic surfactants, and mixtures thereof; and
b) from 0.1% to 10% by weight, of an admixture of two or more oligomers, polymers or copolymers which are formed from the self-condensation of lysine or the reaction of lysine with one or more amino acids or amino acid pre-cursors selected from the group consisting of ornithine, histidine, tryptophan, a $C_2$-$C_{12}$ $\alpha,\omega$-amino acid, valerolactam, caprolactam, and mixtures thereof; or the reaction of lysine with one or more $C_2$-$C_{12}$ $\alpha,\omega$-diamines. --

Signed and Sealed this

Eighteenth Day of February, 2003

JAMES E. ROGAN
*Director of the United States Patent and Trademark Office*